(12) United States Patent
Duke

(10) Patent No.: US 9,474,953 B1
(45) Date of Patent: *Oct. 25, 2016

(54) SYSTEM, METHOD AND PROCESSOR-READABLE MEDIUM FOR WIRELESSLY TRACKING BASKETBALL SHOTS

(71) Applicant: Jason Duke, Delray Beach, FL (US)

(72) Inventor: Jason Duke, Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/498,822

(22) Filed: Sep. 26, 2014

Related U.S. Application Data

(63) Continuation-in-part of application No. 13/217,394, filed on Aug. 25, 2011, now Pat. No. 8,845,461.

(51) Int. Cl.
| | |
|---|---|
| *A63B 69/00* | (2006.01) |
| *A63B 67/00* | (2006.01) |
| *A63B 63/00* | (2006.01) |
| *A63B 63/08* | (2006.01) |
| *A63B 71/06* | (2006.01) |
| *A63B 24/00* | (2006.01) |

(52) U.S. Cl.
CPC ....... *A63B 69/0071* (2013.01); *A63B 24/0021* (2013.01); *A63B 71/0669* (2013.01); *A63B 2071/0663* (2013.01); *A63B 2220/62* (2013.01); *A63B 2220/64* (2013.01); *A63B 2220/801* (2013.01); *A63B 2220/802* (2013.01); *A63B 2220/833* (2013.01); *A63B 2225/50* (2013.01)

(58) Field of Classification Search
CPC .......... A63B 24/0021; A63B 69/0017; A63B 71/0669; A63B 2071/0663; A63B 2230/62; A63B 2230/64; A63B 2230/801; A63B 2230/802; A63B 2230/833; A63B 2225/50
USPC ........................ 473/447, 450, 472, 476, 480
See application file for complete search history.

(56) References Cited

U.S. PATENT DOCUMENTS

2004/0220738 A1* 11/2004 Nissila .............................. 702/3

* cited by examiner

*Primary Examiner* — Omkar Deodhar
*Assistant Examiner* — Wei Lee
(74) *Attorney, Agent, or Firm* — H. John Rizvi; Gold & Rizvi, P.A

(57) ABSTRACT

The present invention is directed to a wireless basketball shot tracking system, method and processor-readable medium that allows a basketball player to train shooting from different locations and/or with different styles as instructed by a hands-free-portable electronic device, and to track the results by a shot detector placed on the backboard or hoop. The shot detector is in wireless communication with the hands-free-portable electronic device. The electronic device stores whether shots are made or missed from the various shooting locations or styles, and provides real-time shooting percentages of basketball players during basketball shooting sessions. The electronic device interfaces with external devices via a wired or wireless communications port for uploading or downloading program updates or shooting session data.

20 Claims, 10 Drawing Sheets

SYSTEM, METHOD AND PROCESSOR-READABLE MEDIUM FOR WIRELESSLY TRACKING BASKETBALL SHOTS

CROSS-REFERENCE TO RELATED APPLICATIONS

This application claims priority to co-pending U.S. Non-Provisional patent application Ser. No. 13/217,394, filed Aug. 25, 2011, which in turn claims priority to U.S. Provisional Patent Application Ser. No. 61/344,627, filed Sep. 1, 2010, all of which are incorporated herein in their entirety.

FIELD OF THE INVENTION

The present invention relates generally to sports training devices or systems. More particularly, the present disclosure relates to a wireless basketball shot tracking system, method and processor-readable medium involving a hands-free-portable portable electronic device that is in wireless electrical communication with a shot detector for instructing a basketball player where to shoot from, how to shoot, or both, and automatically tracking real-time shooting percentages of the basketball player from the instructed shooting styles or locations.

BACKGROUND OF THE INVENTION

Basketball is a popular sport played by professionals and amateurs alike and is also a wide-viewed sport that is typically broadcasted on national and local television. The game is often played in schoolyard playgrounds, at parks, in residential driveways, and at local recreational centers. An organized basketball game is played on a basketball court having a playing surface that consists of a generally rectangular floor and two basketball goals that are disposed at opposite ends of the basketball court and typically positioned ten feet from the court. A basketball goal includes a round metal rim or hoop that is secured to backboard which is attached to a frame, and netting that is suspended from the rim. The diameter of the basketball hoop is larger than that of a basketball to allow the ball to fall through the hoop during play. The playing surface includes a number of geometric markings, such as circles, arcs, and a variety of straight and curved lines, that define the playing boundaries prescribed by game rules. Teams compete against each other over the course of 2 to 3 hours where players assume offensive and defensive roles while attempting to score points by throwing a basketball through the opponent's basketball hoop. The team with the most points wins.

During the basketball game, players normally employ guard, center and forward positions on the basketball court. More particularly, the playing positions are typically defined as point guard, shooting guard, small forward, power forward, and center. Each player assumes a particular position based on the player's performance skills. For example, the player assigned to a point guard position is usually the person who is the team's best basketball handler and passer, and a shooting guard is usually the team's best basketball shooter.

Many individuals simply enjoy the opportunity to shoot basketballs without having to follow particular rules or participate in officiated games. As such, the game is often played with fewer players and basketball shots are made on a basketball goal that is often attached to a garage, or fixed to a frame that is secured to a base having a ballast. Whether on a team or playing solo, basketball players consistently strive to gain the satisfaction of improving the frequency of successful basketball shots.

Players constantly train to perfect their shooting and handling skills of the basketball on the court. A player must develop good balance, coordination, concentration, form and technique, and must also master the ability to make successful shots on goal from various positions on the basketball court. Players spend countless hours practicing a variety of different shots that generally include two-handed shots, one-handed shots, jump shots, hook shots, lay-up shots, one-handed underhand, three-point shots, and bank shots. Since repetitive shots are often made from a single location on the basketball court, the practicing player often becomes accustomed to this level of comfort thereby diminishing the player's ability and confidence to make successful shots from different locations on the court. To improve the frequency rate of successful shots made on basketball goal, it is important for individual players to practice their shooting skills by shooting basketballs from different locations on the basketball court. To better assist individual players in improving their shooting skills, and gaining confidence in their shooting abilities, many players have employed the help of shooting aids.

There are a number of shooting aids on the market today that are designed to help a basketball player improve his/her shooting skills. Examples of shooting aids include: video camera based tracking systems that capture images of shot trajectories; mechanical braces used on an individual's arm, wrist or hand to help position the extremities in proper angle for successfully shooting a basketball within a hoop; spot location devices, such as floor mats or position markers that are placed on a playing surface to indicate shot locations to a player from where to make basketball shots; gesture recognition systems that include a plurality of markers fixed to a person's body to permit a camera to capture and analyze body movements during play; sophisticated computer analysis systems including complex software used for analyzing a basketball player's performance; and finally, a variety of self-contained electronic devices that are attached to a player to provide an audio or illuminated signal to indicate improper positioning of a player, or an indication of a successful shot being made.

Many conventional shooting aid devices or systems are too complex or sophisticated to integrate for use, are expensive, and require time consuming assembly. Other devices are bulky to use, non-user friendly, and are simply ineffective in assisting basketball players for improving their shooting skills. Further, such devices fail to provide a method of being able to keep track of a person's shooting percentages during a basketball shooting session, and to provide a historical log of information for a person to review and analyze to help determine whether improvements are being made over time. Conventional aids that do provide a data log, fail to assist a player in improving their shooting skills from different shooting locations on the basketball court.

Accordingly, what is desired is a basketball shooting aid system that improves a person's shooting performance from multiple locations on a basketball court, monitors and records real-time shooting percentages of basketball players during shooting sessions, and provides historical data for performance review.

SUMMARY OF THE INVENTION

The present invention overcomes the deficiencies known in prior art by providing a wireless basketball shot tracking system and method capable of instructing the player where to shoot from, how to shoot, or both, detecting whether the shot was made, and storing information pertaining to whether the shot was made together with information on the shooting style or location where the player was instructed to shoot from. These steps are performed repeatedly, generating a sequence of shooting styles or locations either randomly or according to predefined training programs. The shooting instructions may be visual, audible and/or tactile. The system consists mainly of a portable electronic device which can be worn or carried by the user without the use of his or her hands, and a shot detector configured to be placed on the backboard and/or hoop. The portable electronic device and the shot detector communicate over radiofrequency (RF).

Introducing a first embodiment of the invention, the present invention consists of a wireless basketball shot tracking system for tracking real time shooting data of basketball shooting sessions, the wireless basketball shot tracking system comprising:

a hands-free-portable electronic device comprising:
a processor, memory, and an RF receiver;
a power source;
a user interface for providing sensory indications to a user;
a shot detector in wireless communication with the hands-free-portable electronic device, the shot detector including a power source, an RF transmitter, and at least one of a vibration sensor, an activator, an infrared sensor, an ultrasonic motion sensor and a motion detector, wherein the shot detector is mountable to a basketball backboard, hoop, net or combination thereof; wherein the hands-free-portable electronic device memory comprises an executable set of instructions to cause the hands-free-portable electronic device to perform the operations of:

a) obtaining a specific basketball shooting style or location from which to carry out a shot, by either reading information from the memory pertaining to the specific shooting style or location or by randomly generating the specific shooting style or location;

b) providing a sensory indication via the user interface corresponding to the specific shooting style or location;

c) receiving a signal from the shot detector, containing information indicating whether the shot has been made or missed;

d) storing the information indicating whether the shot has been made or missed, in association with the specific shooting style or location;

e) repeating steps (a) through (d) a plurality of times, to provide a sequence of basketball shooting style or location sensory indications via the user interface that the user can follow as a training guide.

In a second aspect, the user interface comprises a display, and the sensory indication corresponding to the specific shooting style or location comprises a visual indication provided on the display.

In another aspect, the display operatively depicts at least part of a basketball court, and the sensory indication corresponding to the specific shooting style or location comprises a mark on the at least part of a basketball court.

In another aspect, the user interface comprises a sound emitter or generator, and the sensory indication corresponding to the specific shooting style or location comprises an audible indication provided by the sound emitter.

In another aspect, the user interface comprises a haptic actuator, and the sensory indication corresponding to the specific shooting style or location comprises a tactile indication provided by the haptic actuator.

In another aspect, the hands-free-portable electronic device user interface is operable by the user to provide an input to the hands-free-portable electronic device processor.

In another aspect, the hands-free-portable electronic device further includes a communications port for transmitting and/or receiving digital information to and/or from an external electronic device.

In another aspect, the hands-free-portable electronic device memory further comprises an executable set of instructions to cause the hands-free-portable electronic device to perform the operation of transmitting stored information indicating whether a plurality of shots have been made or missed, and their associated specific shooting style or location, via the communications port.

In another aspect, the activator comprises an elongated paddle having a proximal end and a distal end, the proximal end pivotably connected to a main body of the shot detector.

In another aspect, the shot detector is configured to be situated on the hoop such that the paddle extends along a horizontal plane within a central region of the hoop and the paddle distal end is arranged in the central region.

In another aspect, the shot detector comprises at least one vibration sensor and an activator, and the hands-free-portable electronic device memory comprises an executable set of instructions to cause the hands-free-portable electronic device to perform the operations of:

receiving a signal from the shot detector indicating a vibration has been detected by at least one vibration sensor;
starting a predetermined time counter;
storing information indicating the shot has been missed, in association with said specific style or location, in the event that the predetermined time counter expires without having received a signal from the shot detector indicating the activator has made a positive detection.

In another aspect, the system further includes a telescoping pole having a tip, the tip removably engaging with the shot detector to elevate the shot detector from the ground to attach the shot detector to the hoop.

In another aspect, the hands-free-portable electronic device memory comprises an executable set of instructions corresponding to a program mode for storing a plurality of programs and a plurality of basketball shooting styles or locations, each of the plurality of programs associated with one or more of the plurality of basketball shooting styles or locations.

In another aspect, the hands-free-portable electronic device further comprises an executable set of instructions corresponding to a play mode for providing real time shot data to a user via the user interface, the real time shot data including percentages or ratios of made and/or missed basketball shots.

In another aspect, the hands-free-portable electronic device memory further comprises an executable set of instructions to cause the hands-free-portable electronic device to perform the operations of:

f) receiving a user input from the user interface; and
g) in dependence of the user input, switching between an operational mode in which step a) is carried out by randomly generating the specific shooting style or location, and an operational mode in which step a) is carried out by reading information from the memory pertaining to the specific shooting style or location, the information being comprised in a predefined shooting style or location sequence stored in the memory.

In another aspect, the hands-free-portable electronic device is at least one of a smartphone, a portable media player, a PDA, an electronic device that is wearable on a body part of a user, and any combination thereof.

Introducing another embodiment of the invention, the present invention consists of a wireless basketball shot tracking method, carried out by a hands-free-portable electronic device comprising a processor, memory, an RF receiver, a power source, and a user interface for providing sensory indications to a user, the method comprising the steps of:
 a) obtaining a specific basketball shooting style or location from which to carry out a shot, by either reading information from the memory pertaining to the specific shooting style or location or by randomly selecting a specific shooting style or location from a set of different shooting styles or locations stored in the memory;
 b) providing a sensory indication via the user interface corresponding to the specific shooting style or location;
 c) receiving a signal from a shot detector via the RF receiver, the signal containing information indicating whether the shot has been made or missed;
 d) storing the information indicating whether the shot has been made or missed, in association with the specific shooting style or location;
 e) repeating steps (a) through (d) a plurality of times, to provide a sequence of basketball shooting style or location sensory indications via the user interface that the user can follow as a training guide.

In a second aspect, the method further comprises the steps of:
 f) detecting a user input on the user interface; and
 g) in dependence of the user input, switching between an operational mode in which step a) is carried out by randomly selecting the specific shooting style or location, and an operational mode in which step a) is carried out by reading information from the memory pertaining to the specific shooting style or location, the information being comprised in a predefined shooting style or location sequence stored in the memory.

Introducing yet another embodiment of the invention, the present invention consists of a non-transitory processor-readable medium having processor-executable instructions stored thereon that, when executed by an electronic processor, cause the processor to carry out the operations of:
 a) obtaining a specific basketball shooting style or location from which to carry out a shot, by either reading information from a memory pertaining to the specific shooting style or location or by randomly selecting a specific shooting style or location from a set of different shooting styles or locations stored in a memory;
 b) providing a sensory indication via a user interface corresponding to the specific shooting style or location;
 c) receiving a signal from a shot detector via an RF receiver, the signal containing information indicating whether the shot has been made or missed;
 d) storing the information indicating whether the shot has been made or missed, in association with the specific shooting style or location;
 e) repeating steps (a) through (d) a plurality of times, to provide a sequence of basketball shooting style or location sensory indications via the user interface that the user can follow as a training guide.

In a second aspect, the non-transitory processor-readable medium further comprises processor-executable instructions stored thereon that, when executed by an electronic processor, cause the processor to carry out the operations of:
 f) detecting a user input on the user interface; and
 g) in dependence of the user input, switching between an operational mode in which step a) is carried out by randomly selecting the specific shooting style or location, and an operational mode in which step a) is carried out by reading information from the memory pertaining to the specific shooting style or location, the information being comprised in a predefined shooting style or location sequence stored in the memory.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

DETAILED DESCRIPTION OF REPRESENTATIVE EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

For both descriptive and illustrative purposes, the term "basketball goal" as used herein, refers to a circular metal rim or hoop that is mounted to a generally vertical surface, often referred to as a backboard. The backboard may comprise a generally square or rectangular surface made of metal, fiberglass, acrylic, or tempered glass. A netting material, often constructed from a cotton or vinyl material, is suspended from the hoop. The diameter of the hoop is larger than that of a basketball to allow the ball to fall through the hoop and netting. The term "missed basketball shot" is defined by a basketball that has come into contact with a basketball hoop or backboard but has not passed through the hoop. The term "made basketball shot" is defined by a basketball that may or may not have come into contact with a basketball hoop or backboard, and that has passed through the hoop to result in points.

The basketball shot tracking system of the present invention comprises a hands-free-portable electronic device and a shot detector. The term "hands-free-portable device" is used throughout the present document to refer to a device that can be worn on the user's body or carried by the user without the need of using his or her hands (e.g., carried in a pocket). In other words, the user is able to wear or carry the hands-free-portable electronic device while his or her hands remain entirely free for playing basketball. In turn, the shot detector is to be installed on the basketball backboard, hoop, net, or any combination thereof, in accordance with different embodiments of the invention, as will be explained.

Figure 1:
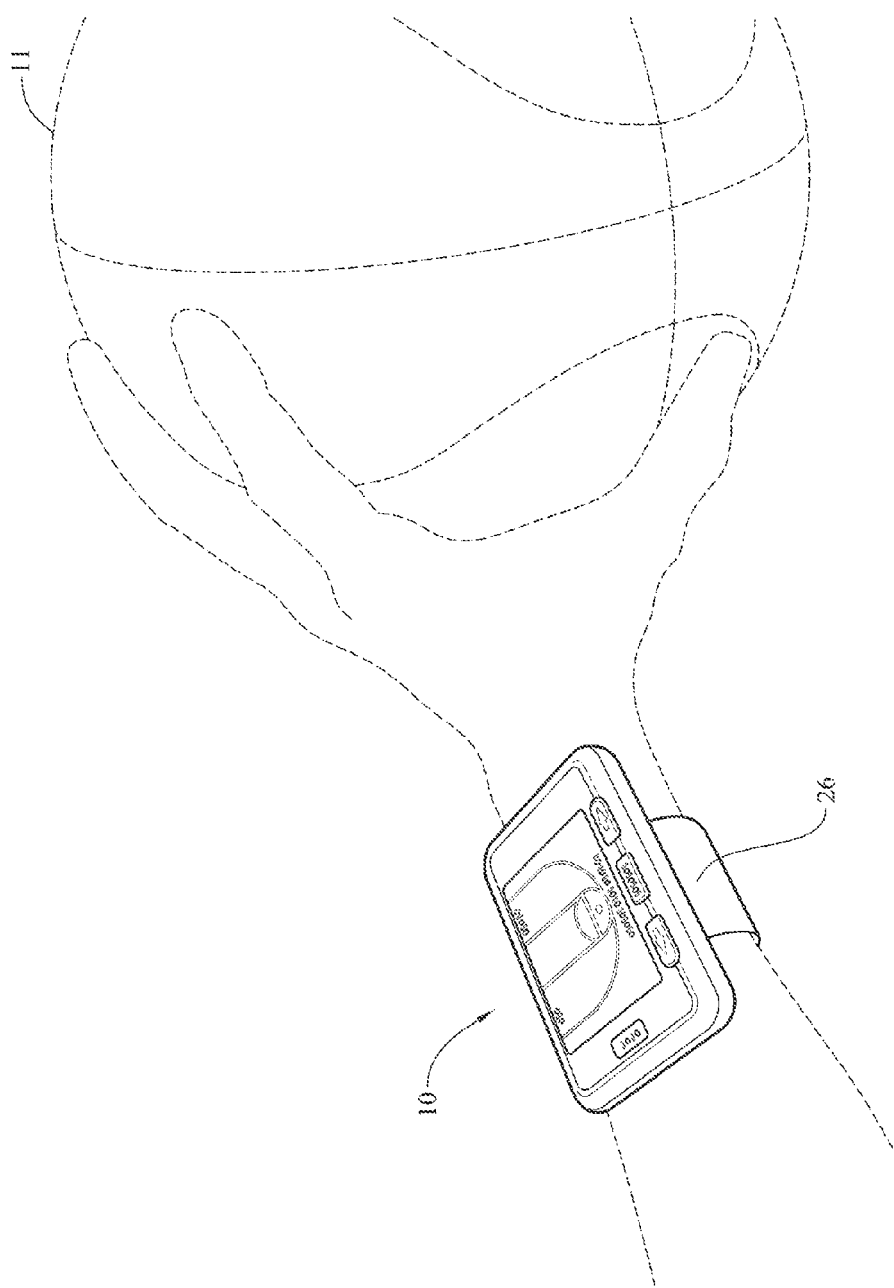
FIG. 1 is a perspective view of an exemplary electronic display unit mounted on the wrist of a basketball player, according to the present invention.

Referring to the drawings, wherein like elements are represented by like numerals throughout, exemplary embodiments of the invention are depicted in which the hands-free-portable electronic device is a wrist-wearable device that the player can wear on his or her wrist while playing basketball, as shown in FIG. 1. The wrist-wearable device is provided with a display, and referred to generally as display unit 10 throughout the present description. The display unit 10 allows monitoring and recording basketball shot accuracy for real-time feedback and long term tracking. In addition, the depicted embodiments include a shot detector 40 such as that of FIG. 6 for sensing and detecting basketball shots made on a basketball hoop. The shot detector 40 is in wireless communication with the wrist-mountable display unit 10. In addition, the system can include a telescoping mounting pole 80 such as that of FIG. 9 for mounting the shot detector 40 to a basketball hoop. The wrist mountable electronic display unit 10 is in wireless communication with the shot detector 40 using RF (radio frequency) technology.

Figure 2:
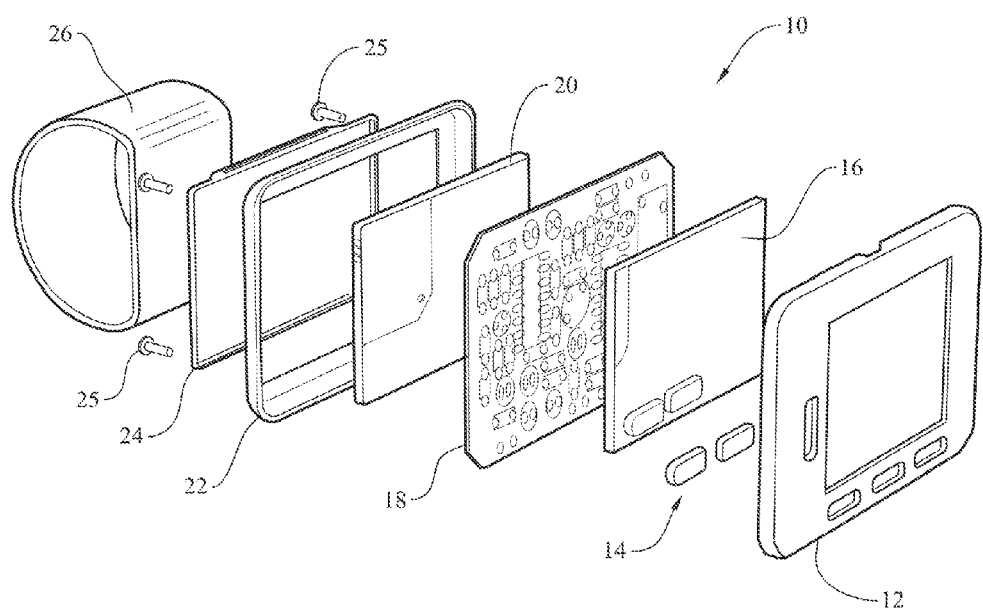
FIG. 2 is an exploded view of the electronic display unit of FIG. 1, according to the present invention.

The structural features of the programmable electronic display unit 10 are better illustrated in FIGS. 1 and 2. With reference to FIG. 1, the wireless basketball shot tracking system includes the aforementioned electronic display unit 10 configured to be removably secured to the wrist of an individual with comfort and ease. The electronic display unit 10 is lightweight, compact, and does not restrict a wearer's ability to play with a basketball 11 with the use of both hands. Display unit 10 allows a user to view data shown on a display with a slight rotation of the wrist, similar to viewing time on a wrist watch.

As shown in FIG. 2, the electronic wrist-mounted display unit 10 of the present embodiment includes a rubberized front housing 12 including a number of openings for receiving corresponding input buttons or keys 14. In addition, the display unit 10 includes an LCD, LED or other applicable display 16 for displaying a symbolic representation of a basketball half-court along with spot location and shooting data, and a circuit board 18 including the necessary operating electronics such as one or more processors for processing data, memory for storing data, and a wireless RF receiver. A processor is understood to encompass any one of a microprocessor, microcontroller, DSP, or any applicable digital processing unit or combination thereof. The display unit 10 further includes a power source 20, a rear housing 22 having a rubber coating, a rubber battery door 24, and a number of screws 25 for assembling the structural components together to provide a small, compact, waterproof display unit 10.

The display unit 10 also includes a wrist attachment 26 for firmly securing the display unit 10 to an individual's wrist. The wrist attachment 26 comprises a strap constructed from any one of plastic, elastic, rubber, fabric, nylon, leather, or other suitable material. The strap may comprise any suitable length and width, and may also include a cushioning material such as foam or rubber to enhance the comfort level when wearing the unit 10 on the wrist. A fastener is used to firmly secure the wrist attachment 26 onto an individual's wrist. Exemplary fasteners may include, but are not limited to, adjustable fasteners, hook and loop (Velcro®), quick release buckles, metal crimps, snaps, magnets, or any other suitable fastener.

Figures 3, 3A:
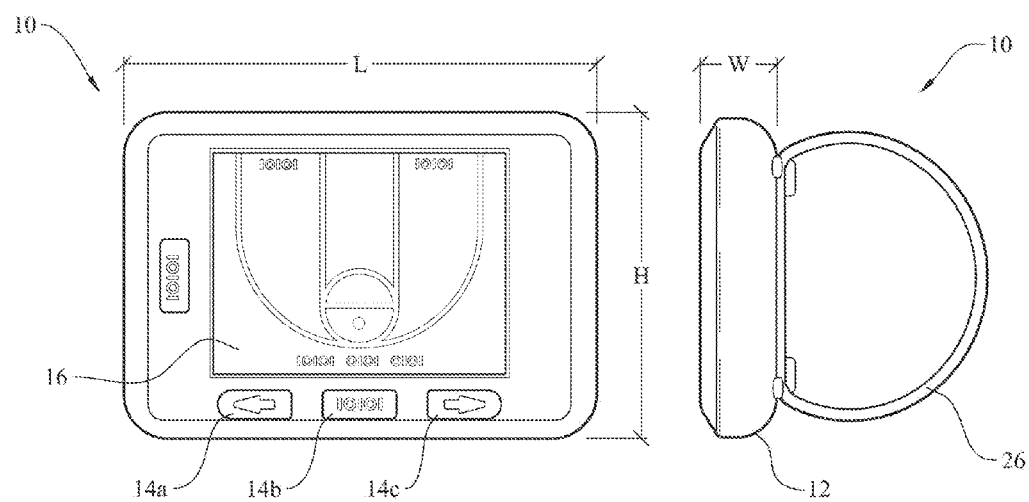
FIG. 3 is a front elevation view of the electronic display unit of FIG. 2.
FIG. 3A is a left side elevation view of the electronic display unit of FIG. 2.

Turning to FIGS. 3 and 3A, there is shown a front and side view, respectively, of the display unit 10, in accordance with the present invention. Preferably, the display unit 10 is small enough to comfortably fit on an individual's wrist with ease. To meet this accommodation, in one exemplary embodiment, the display unit 10 is 3.25 inches in length, L, 2.25 inches in height, H, and 0.5 inches in width, W. The exemplary dimensions of the display unit 10 results in a functionally compact display unit 10 that can be comfortably worn a person's wrist without restricting the use of the arms or hands, or the ability to program the display unit 10. The preferably large display 16 provides viewing the display with ease. It should be noted that specified dimensions provided herein are for illustrative purposes only, and the function or practice of the invention is not limited by any specific dimension.

With the advent of advancing technologies, compact circuitry, smaller power sources, and enhanced displays may help reduce the overall size of the display unit 10. The display unit 10 may use a flexible circuit board with mounted electronic components, integrated circuit technology, or utilize chip on board technology to help save space and reduce costs.

Figure 4:
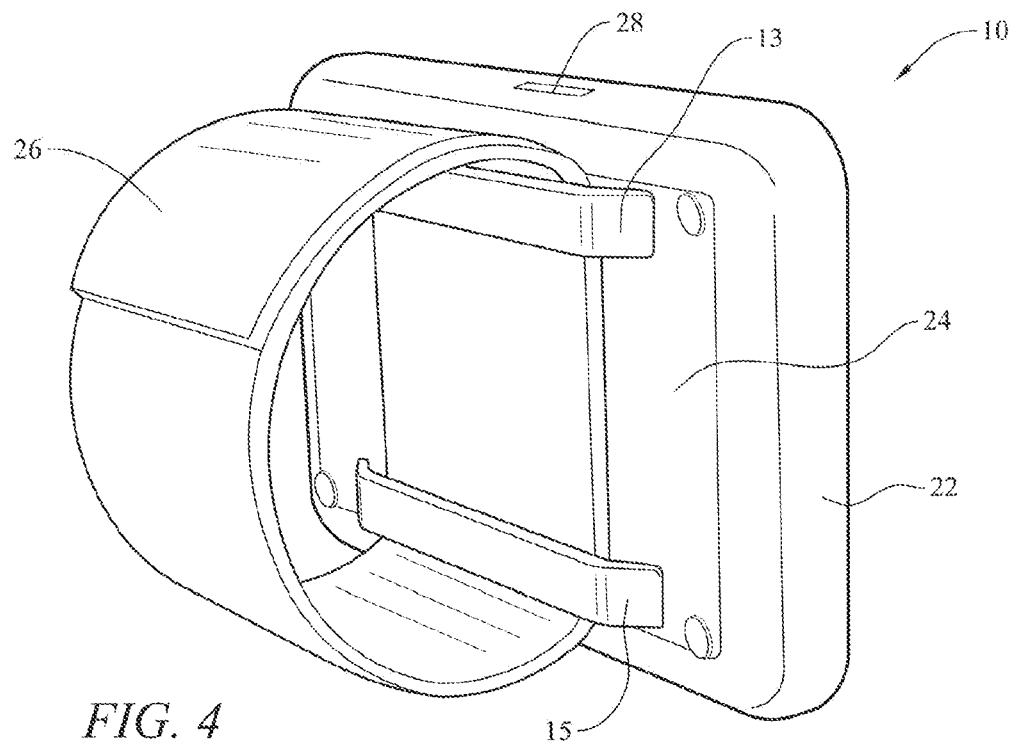
FIG. 4 is a rear perspective view of the electronic display unit of FIG. 2.

The illustration of FIG. 4 shows a rear perspective view of the electronic wrist-mountable display unit 10, in accordance with the present invention. As the figure illustrates, display unit 10 includes two horizontal bars 13, 15 attached to the outer surface of the battery door 24 and aligned vertically with each other to define a pair of wrist strap apertures for receiving the wrist attachment 26 there through. Each wrist strap aperture is slightly wider than the width of the wrist attachment 26 allowing the attachment 26 to slide freely through the apertures. The functional combination of the horizontal bars 13, 15 and wrist attachment 26 operate to firmly hold the electronic display unit 10 onto the wrist of a user.

The display unit 10 includes a front housing 12, rear housing 22, and rubber door 24 that are preferably constructed from ABS (Acrylonitrile Butadiene Styrene) which provides a strong, durable and lightweight material. Advantageously, display unit 10 is waterproof to prevent damage from water or sweat often resulting from player's rigorous activity. The display unit 10 includes rounded, smooth edges and corners to provide an ergonomically design that adds comfort and provides safety during use. The aesthetic appearance of the display unit 10 may be enhanced by providing a housing 24 that comes in a variety of different colors, designs, or patterns. The display unit 10 may also include markings or indicia such as the figure of a basketball player shooting a basketball, or mountable orientation markers, etc.

As seen in FIG. 4, the wrist-mountable display unit 10 further includes a USB (universal serial bus) port shown at 28. In one exemplary embodiment, the USB port 28 is situated on top of the display unit 10 to allow easy access to the USB port; however, it will be noted that the USB port 28 may be situated anywhere on the display unit 10. The USB port 28 allows stored data within the display unit 10 to be uploaded to an external computer, or to an external storage device such as a flash memory stick, hard drive, or CD. In one example, the display unit 10 may be coupled to a computer (not shown) to upload data to the computer for processing, viewing or manipulating data. Display unit 10 may also be coupled to a printer (not shown) for printing shot data of a basketball shooting session, or a historical data log. In alternative embodiments, the display unit 10 may include additional or alternative communications port, which may be wired or wireless, for transmitting and/or receiving digital information to and/or from an external electronic device. For instance, the display unit 10—or hands-free-portable device in general—can include Bluetooth, Wi-Fi, Ethernet or other communications port(s) for establishing a data transfer with a local or remote device. The communications port(s) may comprise the necessary software instructions to operate over the Internet or other private or public networks, or allow for any type of alternative connection with one or more external devices, in order for the devices to upload and/or download data from and/or to the display unit 10 or other hands-free-portable device.

Display unit 10 can also include a recharging port and/or docking station (not shown) that allows a user to recharge the power source of display unit 10. For example, the recharging port may be electrically interfaced with the charging docking station, or simply comprise an electrical receptacle for charging the display unit 10, via, an AC adapter. The power source 20 may include a rechargeable or non-rechargeable power source. In one non-limiting example, the power source 20 includes a lithium ion battery or batteries.

Figure 5:
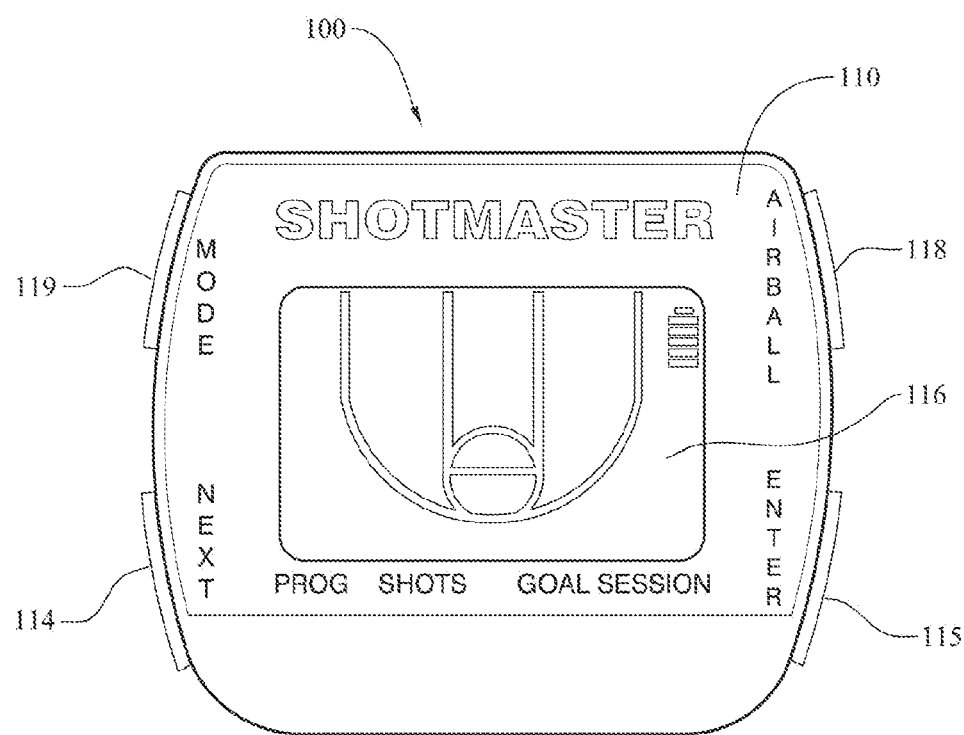
FIG. 5 is a front elevation view of an electronic display unit, according to another embodiment of the present invention.

The illustration of FIG. 5 shows a front view of a display unit 100 in accordance with an alternative embodiment of the present invention. Display unit 100 includes a wrist strap attached to a durable, waterproof body 110. Display unit 100 is configured to resemble the physical attributes of a wrist watch providing for a smaller, more compact device that is comfortably worn on the wrist of a player. Similar to display unit 10, display unit 100 includes a display 116 for providing a symbolic image or layout of a basketball half court, a navigation button 114 (shown as "NEXT"), an enter button 115, and a mode button 119 for selecting the various modes of operation that include the program mode, play mode, review mode and random mode, as described further below. Display unit 100 also includes indicia, disposed on the housing, to identify the program selection (PROG), shots made (SHOTS), goals made (GOAL) and the session being played (SESSION). Unit 100 further includes an airball button 118 that allows a user to record missed shots in the event an airball is thrown and the airball misses the rim 71, backboard 74 or shot detector 40. On such occasions, a user can simply depress the airball button 118 to individually record all missed shots during playing sessions. Similarly to the previous embodiment, display unit 100 also includes a USB port (not shown) to upload and/or download data or information to and/or from a computer or external memory.

Although display units 10 and 100 are described to include a wrist strap so as to attach the display unit 10, 100 to an individual's wrist, it will be noted that the display units 10, 100 will operate to record overall shooting percentages of made basketball shots and missed basketball shots when the display units 10, 100 are not mounted to the wrist of an individual. A person can place the display unit 10, 100 in a bag, on the ground, in a pocket, or near the playing surface, and continue to register and record made and missed basketball shots. This feature may be beneficial for those individuals who do not feel comfortable wearing the display unit 10, 100 on their wrist.

Figure 6:
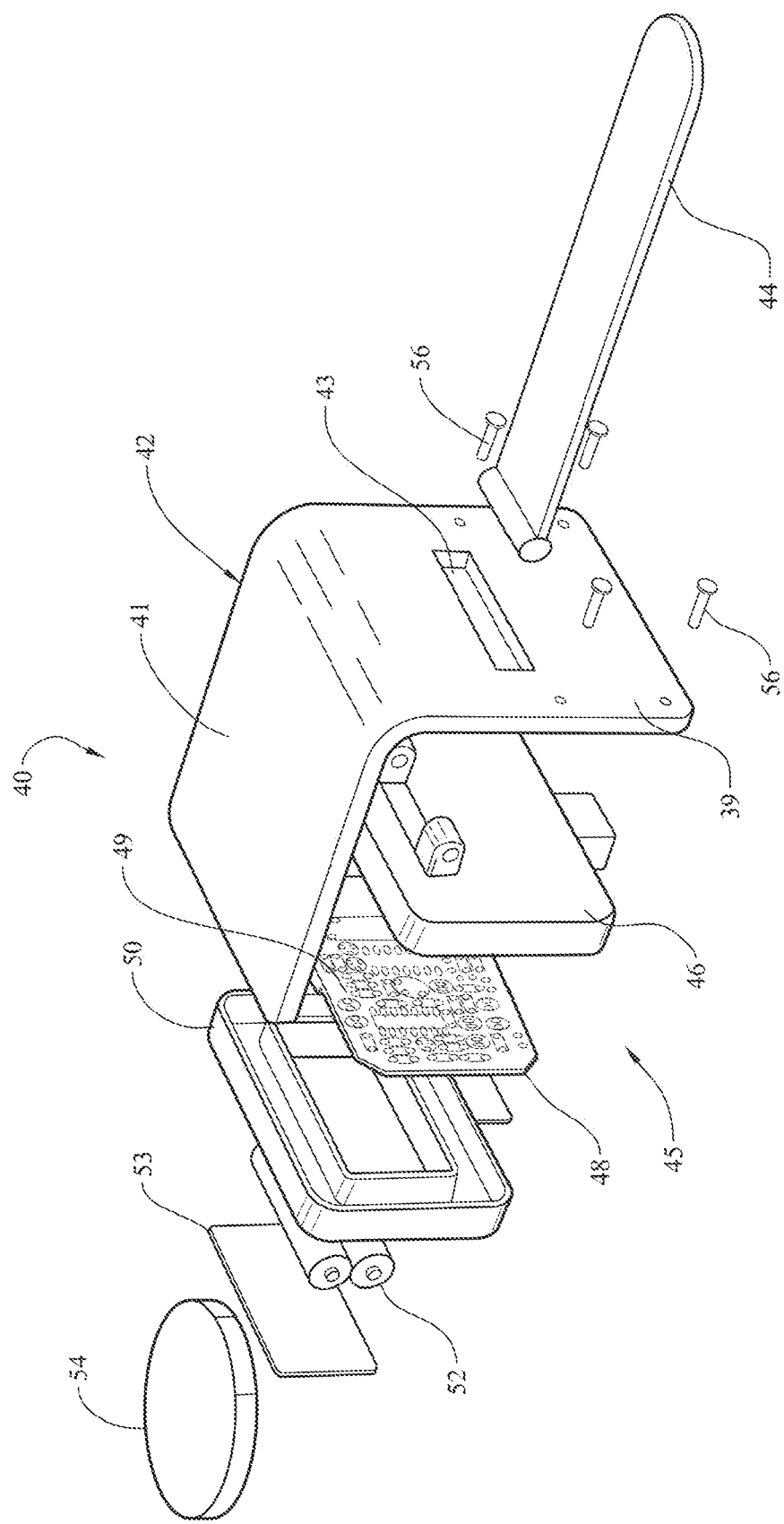
FIG. 6 is an exploded view of an exemplary shot detector according to the present invention.

With reference now made to FIG. 6, there is shown an exploded view of a wireless basketball shot detector 40 having a mounting element including a magnet, in accordance with the present invention. Shot detector 40 is implemented to detect made basketball shots and missed basketball shots and to transmit that information to the display unit 10, via a transmitter. In one embodiment, shot detector 40 includes a mounting system that generally entails four parts: an L-shaped bracket 42, a circuit housing 45, an activator or paddle 44, and an attachment 54. The L-shaped bracket 42 and the circuit housing 45 form a main body of the shot detector 40. The L-shaped bracket 42 includes a horizontal member 41 integrally formed with a vertical member 39, and is preferably fabricated from aluminum, stainless steel or a galvanized metal, to resist rusting over time. However, it will be noted that the L-shaped bracket 42 may be fabricated from steel, a durable plastic or metal. Vertical member 39 includes an elongated, horizontal aperture 43 sized for receiving paddle posts 47, 51, as is better illustrated in FIG. 6, and holes for mounting the electronic circuit housing 45 to the L-shaped bracket 42 via, mounting screws 56.

Circuit housing 45 includes a front panel 46 having a pair of posts 47, 51 spaced apart from each other along a same horizontal axis and extending forward, a circuit board 48 having the necessary working electronics that include a circuit board 48 for mounting thereon one or more vibration sensors 49, and an RF transmitter for electrically transmitting data signals to a wireless RF receiver that is located within display unit 10, 100. Circuitry housing 45 further includes a back panel 50, a power source 52 electrically coupled to the circuit board 48 to power the one or more vibration sensors 49, RF transmitter and other functional electronics. Power source 52 may comprise rechargeable or non-rechargeable power sources. In one non-limiting example, the power source 52 includes AA or AAA batteries. Circuit housing 45 also includes a closure 53 for securing the power source 52 within a battery holding chamber. The closure 53, rear panel 50 and front panel 46 are assembled together to encase the power source 52 and circuit board 48 in a durable, waterproof enclosure. The circuit housing 45 is fastened to the inner surface of the vertical member 39 via, screws 56 such that posts the 47, 51 extend through the elongated, horizontal aperture 43.

Paddle or activator 44 includes a proximal end and a distal end having a rounded contour. The proximal end is pivotably attached to posts 47, 51 via, a biasing element (not shown). When a basketball is thrown from a shooting location on the basketball court and enters the basketball hoop 71, the ball engages paddle 44, and a downward force is applied to the paddle 44 forcing the paddle to pivot downward resulting in a signal being generated. The generated signal is transmitted to the display unit 10, 100 via a RF transmitter. When the basketball has cleared the swinging angle of the paddle 44, the biasing element, such as a spring or tension element, forces the paddle 44 to spring back to a generally, horizontal position ready to detect any subsequent downward force generated from a basketball passing through a basketball hoop 71. Paddle 44 can be fabricated from metal, steel, plastic or aluminum. In one non-limiting embodiment, paddle 44 is transparent to camouflage the view of the paddle 44 when the shot detector 40 is mounted to the hoop or rim 71 of a basketball goal 70, as better illustrated in FIG. 10.

Figure 7:
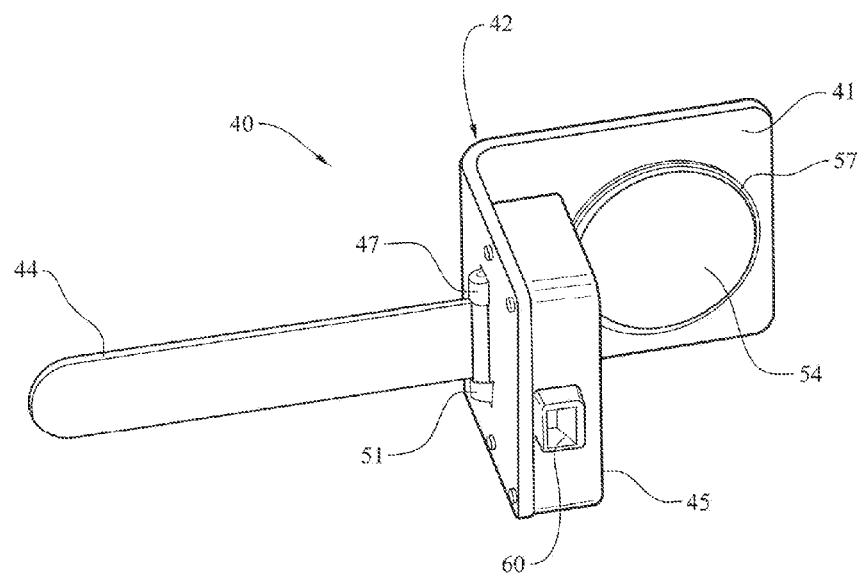
FIG. 7 is a perspective view of the shot detector of FIG. 5, in an assembled state.

As illustrated in FIG. 7, the L-shaped bracket 42 includes a raised circular rim 57, formed on the inner surface of the horizontal member 41 that defines a receptacle for receiving an attachment 54 therein. The attachment 54 is contained within the receptacle by adhesive, contact glue, or non-conductive solder. In the preferred embodiment, attachment 54 comprises a round, neodymium magnet. The magnet 54 allows a user to temporarily secure the shot detector 40 to a basketball hoop 71 without difficulty.

Circuit housing 45 further includes a pole receptacle 60 having a generally rectangular or square aperture for receiving the tip end of a telescoping pole 80 for temporarily mounting the wireless basketball shot detector 40 on a basketball rim plate from the ground. The aperture of the pole receptacle 60 is deep enough to prevent the shot detector 40 from swaying or easily falling off the tip end of the pole 80. Alternatively, pole receptacle 60 may include a friction engagement (not shown) such as a spring clip, spring detents, ball detents or the like to help secure the shot detector 40 on the tip end of the pole 80 to prevent the shot detector 40 from falling off the tip end of the pole 80 when the shot detector 40 is being installed on or removed from rim 71.

Figures 8, 8A:
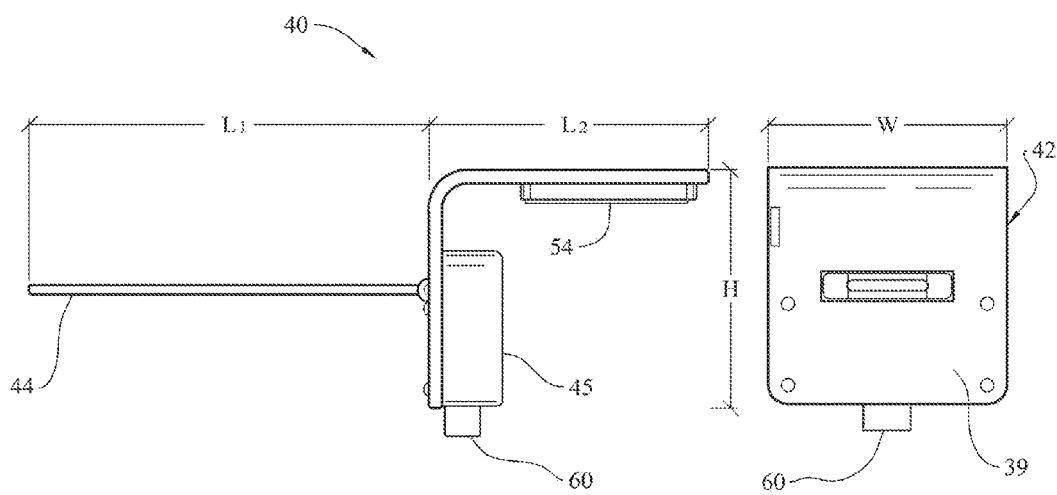
FIG. 8 is a side elevation view of the shot detector of FIG. 6, showing exemplary dimensions.
FIG. 8A is a front elevation view of the shot detector of FIG. 6, showing exemplary dimensions.

Exemplary dimensions of the shot detector 40 are provided in FIGS. 8 and 8A. In the non-limiting embodiment, the contact paddle 44 is 5 inches in length, L1, and the L-shaped bracket 42 includes a horizontal member 41 that is 3.5 inches in length, L2, and a vertical member 39 that is 2 inches in height H. The exemplary width, W, of the vertical member 39 is 3 inches. Shot detector 40 is dimensionally sized to be attached to the rim plate 73 of a basketball hoop 71 by magnet 54. To illustrate again, paddle 44 extends partially within a central region of the hoop 71, along a horizontal axis, as better illustrated in FIG. 10. It should be noted that specified dimensions provided herein are for illustrative purposes only, and the function or practice of the shot detector 40 is not limited by any specific dimension.

Figure 9:
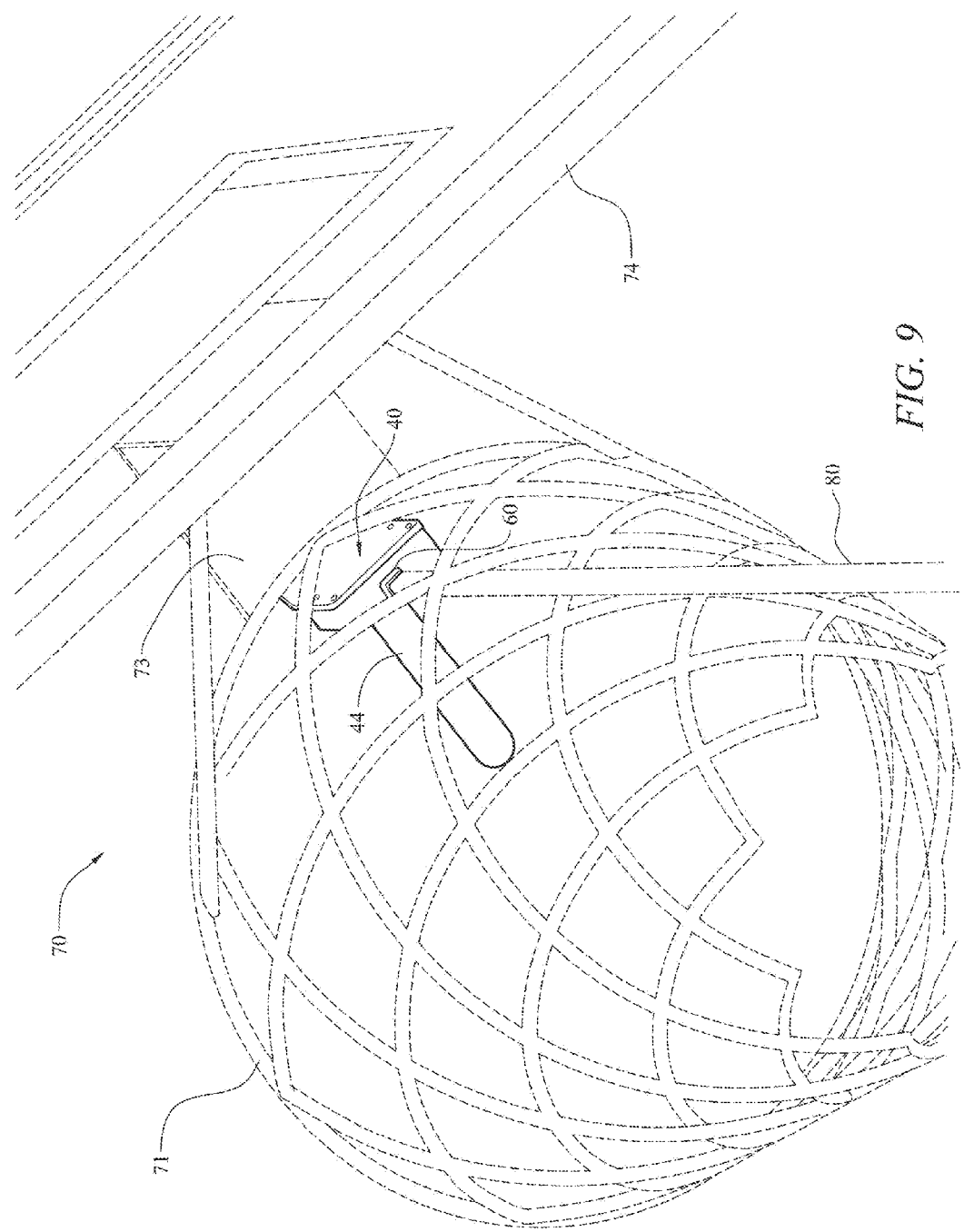
FIG. 9 is a bottom perspective view of the shot detector of FIG. 6, shown being mounted to a basketball hoop from the ground with a telescoping pole, according to the present invention.
Figure 10:
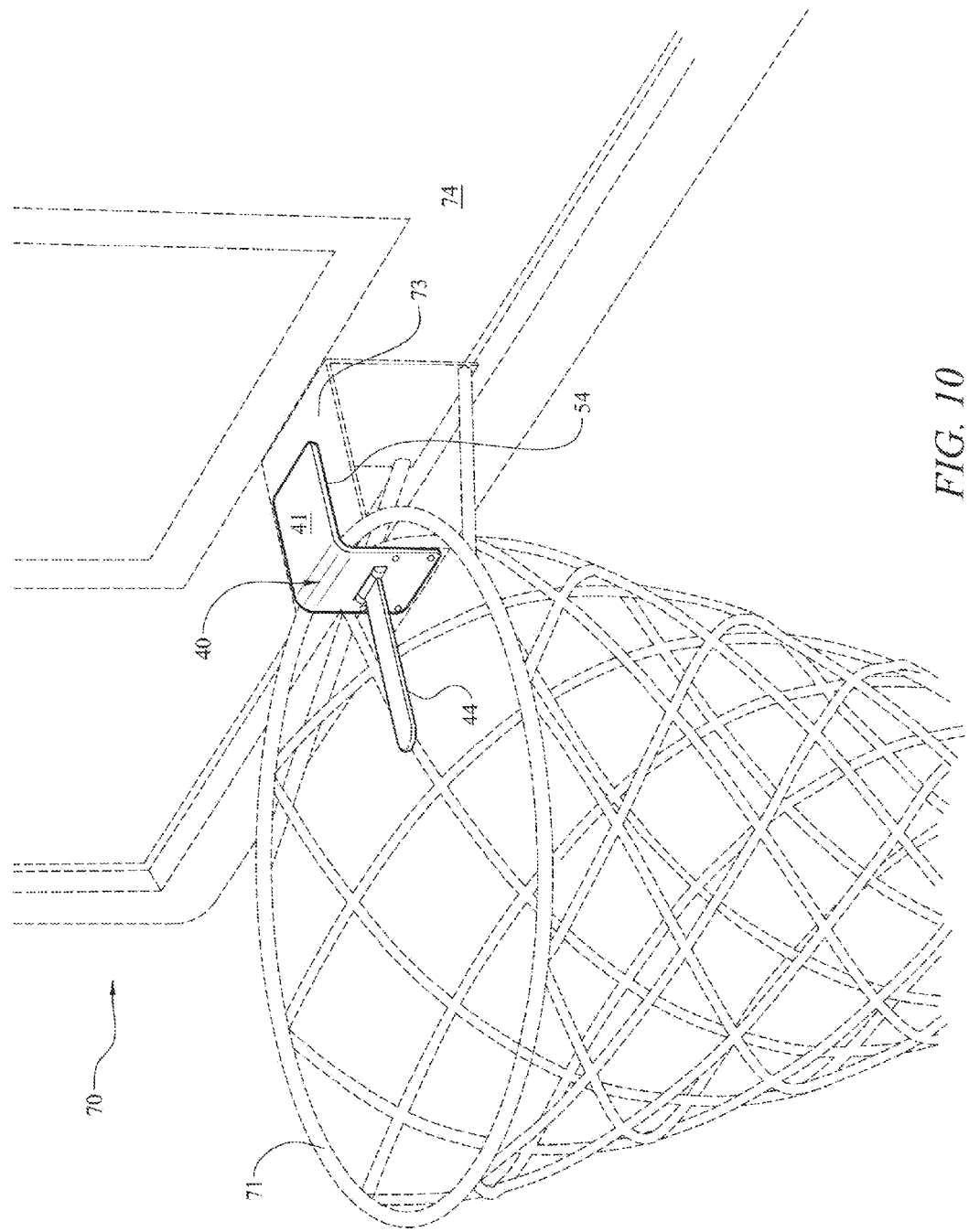
FIG. 10 is a top perspective view of a shot detector mounted to a basketball hoop using a mounting mechanism including a magnet, according to one embodiment of the present invention.

The illustrations of FIGS. 9 and 10 show a bottom and top perspective view, respectively, of shot detector 40 being mounted to the hoop or rim 71 of a basketball goal 70. Basketball goal 70 includes a circular metal rim 71, having a generally horizontal rim plate 73 that is attached to a backboard 74 and a netting material suspended from the rim 71 to serve as a basketball net. To mount the shot detector 40 onto the basketball hoop 71, a user simply inserts the tip end of a telescoping pole 80 into the pole receptacle 60 of the shot detector 40 and while standing on the ground, the person simply elevates the shot detector 40 using the pole 80 to securely attach the detector 40 to the rim plate 73 of the hoop 71. The neodymium magnet 54 firmly adheres to the metal plate 73, as shown in FIG. 10. Once the shot detector 40 is securely situated, the user can easily remove the tip end of the pole 80 from receptacle 60.

Figure 11:
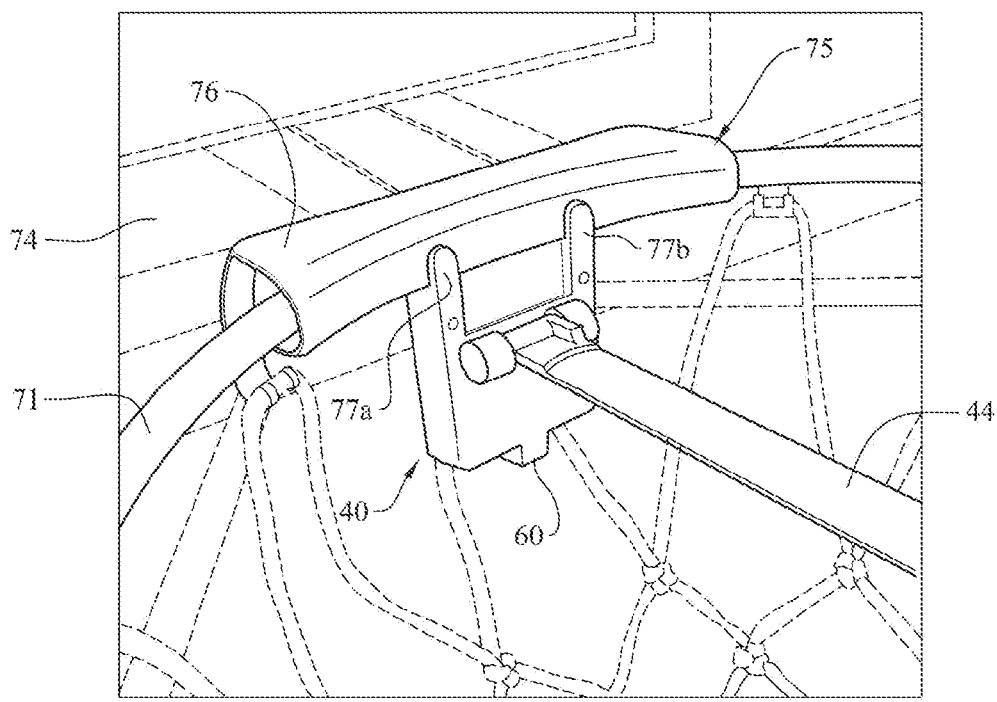
FIG. 11 is a top perspective view of a shot detector mounted to a basketball hoop using an alternative bracket mount, according to yet another embodiment of the present invention.
Figure 12:
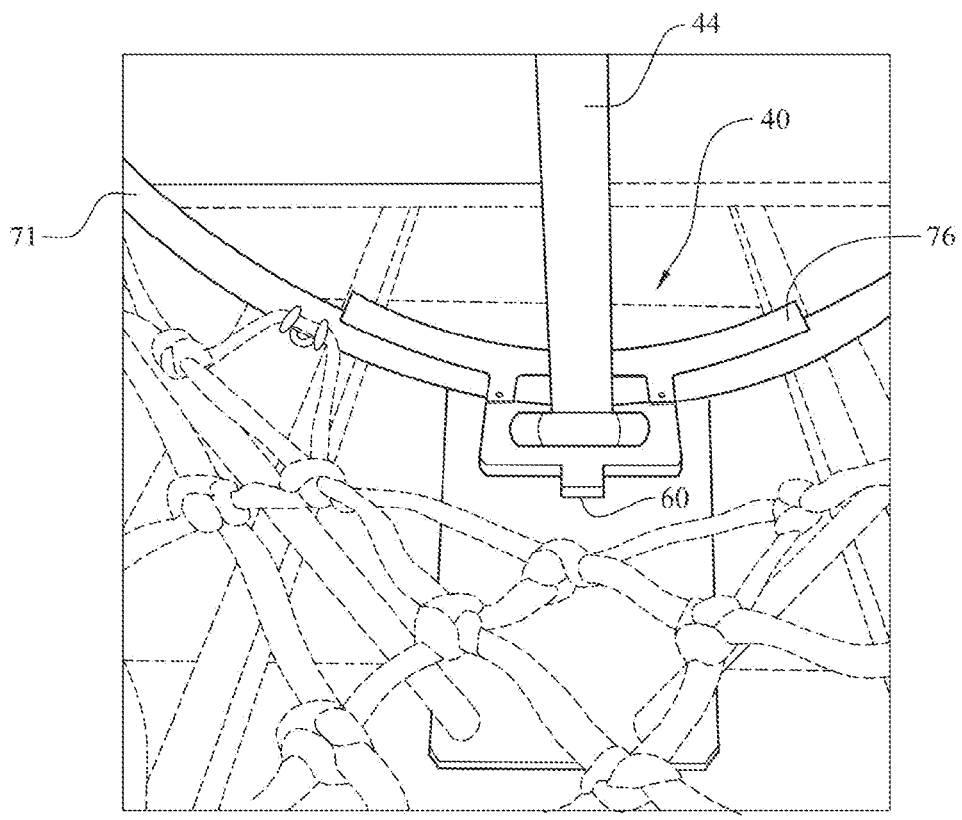
FIG. 12 is a bottom perspective view of the shot detector and basketball hoop of FIG. 11.

The illustrations of FIGS. 11, and 12 show a top and bottom perspective view, respectively, of shot detector 40 including an alternative mounting system for attaching the shot detector 40 to the rim 71 of a basketball goal. In this alternative embodiment, shot detector 40 includes a bracket style mounting system 75 including a bracket 75 having a rim member 76. Rim member 76 includes a generally horizontal, inverted U-shaped channel that is sized to slip securely over rim 71. The inverted U-shaped channel follows the dimensional contour of the rim 71. As shown in FIG. 11, bracket 75 is attached to the shot detector housing 45 by two extension members 77a and 77b that are integrally formed with rim member 76. Preferably, bracket 75 is constructed from aluminum but may be constructed from other materials such as metal, steel, or a hard, durable plastic. Bracket 75 may snap onto rim 71 or alternatively, bracket 75 may include fasteners to secure the bracket 75 to the rim 71.

Figure 13:
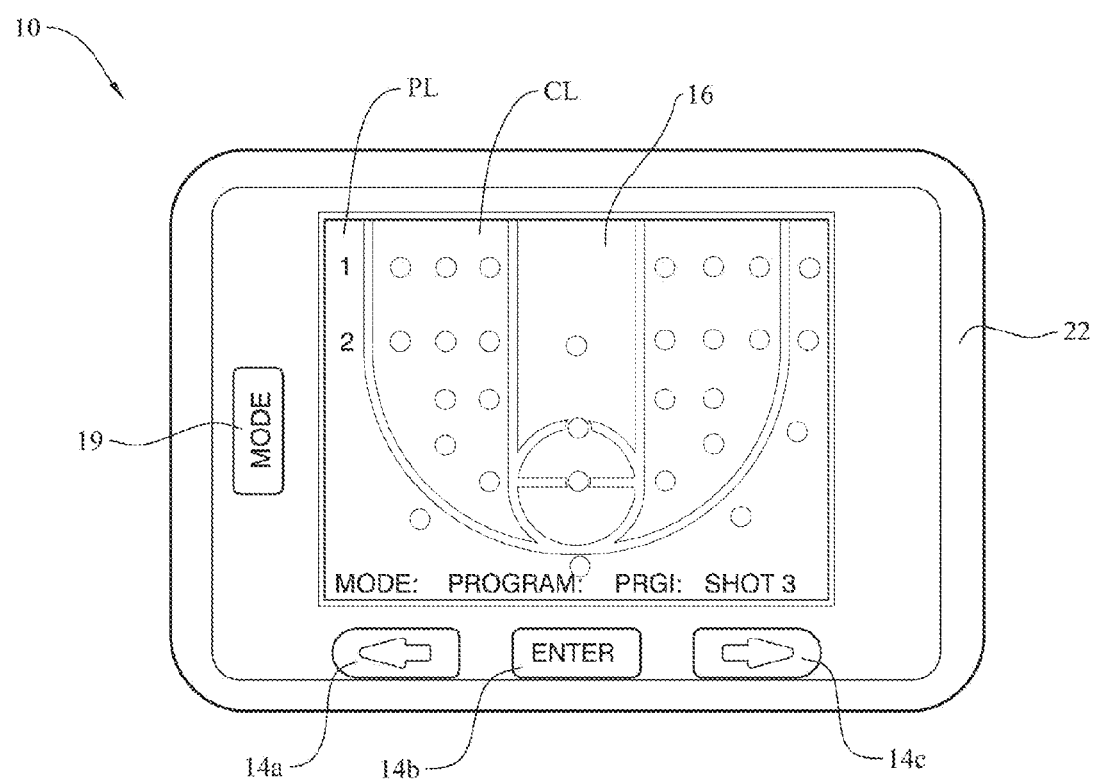
FIGS. 13, 14 and 15 are front elevation views of the electronic display unit of FIG. 1, showing shooting locations on a symbolic half court on the display, and statistical shooting data when operating the unit in a program mode, a play mode, and a review mode, respectively, in accordance with the present invention.

As referenced in FIG. 13, the electronic wrist-mountable display unit 10, 100 includes a display 16 for displaying, shooting locations on a basketball half-court, and statistical data including shooting session dates, percentages and ratios of made basketball shots and missed basketball shots. The electronic display unit 10, 100 is programmable to customize basketball shooting locations and to review shooting data by providing four operative modes that include a program mode, a play mode, a review mode, and a random mode. Each operative mode is selected by a mode button 19, 119 and an enter button 14b, 115 and navigating within each mode is provided by left, right and next buttons 14a, 14c, 114, respectively.

Program Mode

With continued reference to FIG. 13, the display unit 10, 100 is originally powered on by pressing and holding the mode button 19, 119. Once the electronic display unit 10, 100 is powered, the user sequentially depresses the mode button 19, 119 to select program mode. The type of mode selected is shown on the display 16, 116 along with a symbolic representation of a basketball half court. The symbolic outline of the half court, shown on the display 16, 116, corresponds to a physical basketball half court.

In program mode, the user programs the display unit 10, 100 to store a plurality of programs and a plurality of shooting locations that are representative of shooting locations on a basketball half court. Each program is associated with one or more shooting locations. For example, a first program may include a first shooting location, and a second shooting location, where the first shooting location is different than the second shooting location. A second program may include a third shooting location, a fourth shooting location, and a fifth shooting location, where all programmed shooting locations are representative of different standing locations on a half court of a basketball. The user depresses the enter key 14b, 115 to enter the programming parameters. The scrolling keys 14a, and 14c and next key 114 are used to move between different programs and shooting locations on the half court. The display unit 10, 100 displays a program location PL, and a current location option CL. In program mode, a user enters an X amount of programs and an X amount of shooting locations. Display unit 10, 100 may be designed to allow a user to program and store 50 programs and 33 shooting locations, or 15 programs with 50 shooting locations, etc. The amount of programs and shooting locations that may be entered is defined by the memory and storage capacity of the display unit 10. Shooting locations and programs can also be updated or changed using a computer or laptop. The computer or laptop is electrically coupled to the display unit 10, 100 via, USB port 28.

Play Mode

Figure 14:
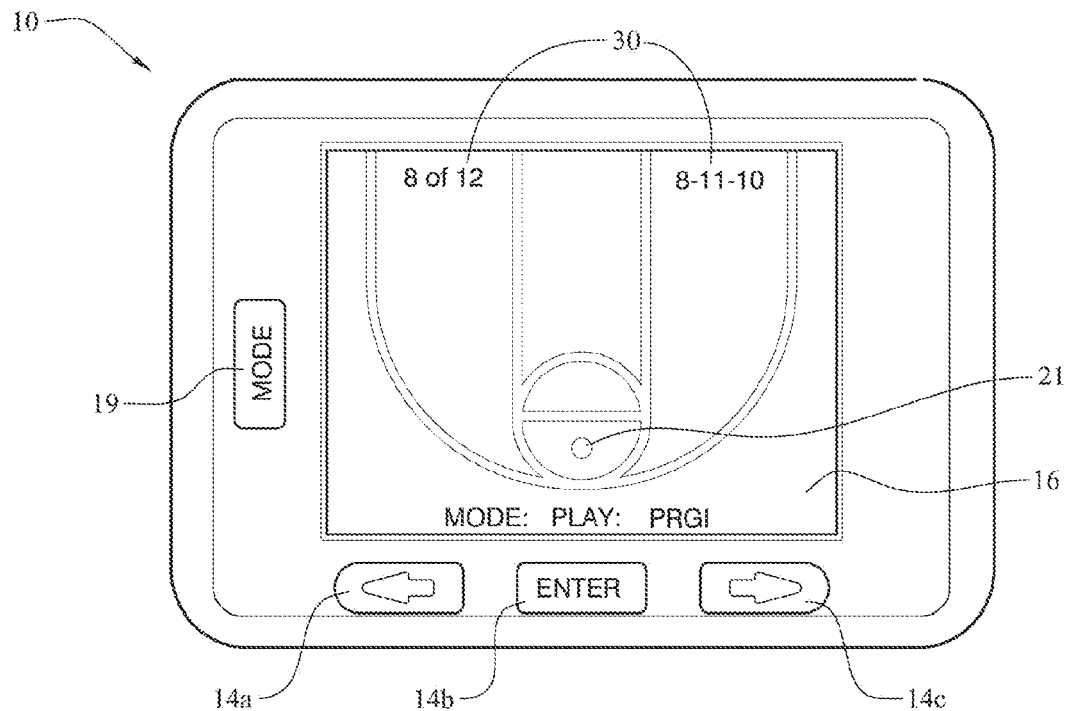

After programming the wrist-mounted display unit 10, 100 with a number of different programs and associated shooting locations, the user is ready to play. The user accesses play mode via, mode button 19, 119. Enter and arrow buttons 115, 14a, 14c, are depressed to navigate among the many programs that were programmed earlier by a user during the program mode, and the enter button 14b is depressed to select a particular preconfigured program desired. Upon selecting a desired preconfigured program, a blinking indicator 21 appears on the display 16, 116 to indicate to the user a shooting location on the symbolic half court from which the user is to shoot the basketball from, as illustrated in FIG. 14. The blinking indicator 21 identifies shooting locations that were programmed earlier by the user during the program mode. The player views the blinking indicator 21, and physically stands on the basketball court at the location shown on the symbolic half court of the display 16, 116. The indicated shooting location corresponds to the physical shooting location on the basketball half court. The symbolic half court diagram and blinking indicator 21 both provide a combinational tool to help a user to improve his or her shooting skills from different locations on a real basketball court. Once the program parameters are satisfied, a player selects a subsequent preconfigured program by simply depressing the navigating keys 14a, 14b and 14c.

During play mode, a number of basketball shots are made with a basketball from a number of different shooting locations. The user moves from place to place on the half court by selecting different programs that were pre-programmed by the user. Made basketball shots are detected via, paddle 44 of shot detector 40, and a wireless signal representing the made shot is transmitted to the display unit 10, 100 and stored therein. Missed basketball shots are also detected, via, a vibration sensor located in the shot detector 40, and a wireless signal representing the missed shot is transmitted to the display unit 10, 100 and stored therein. Display unit 10, 100 records and stores the made shots and missed shots. In play mode, the display unit 10, 100 displays shooting statistics in percentages or ratios, and the corresponding date or dates, as denoted at 30.

Play mode also includes a variety of common basketball shooting games to add an element of additional fun for users. Such games may include H.O.R.S.E. and Around the World and 5 consecutive shots. The games can be programmed to allow a user to compete against a user's previous all-time best. User's may simply select such games using the mode, and enter buttons 19, 119, 14b, and 115, respectively.

Random Mode

The electronic wrist-mountable display unit 10, 100 may further include a random mode, selected by the mode button 19, 119 to further challenge a player and to randomly provide shooting locations from which a player must shoot a basketball. In random mode, display unit 10, 100 randomly generates a blinking indicator on the symbolic half court on the display 16, 116. The player must attempt to shoot a basketball from the location specified by the blinking indicator on the half court. In random mode, a player is not aware of the next shooting location. The benefit of the random mode is to interrupt any conditioned pattern of shooting that a player may have come accustomed to during normal programming and playing. The random mode continuously challenges the performance and skills of the player thus training the player to develop well rounded shooting skills so that player can become proficient at successfully shooting basketballs from any location on the basketball court.

Review Mode

Figure 15:
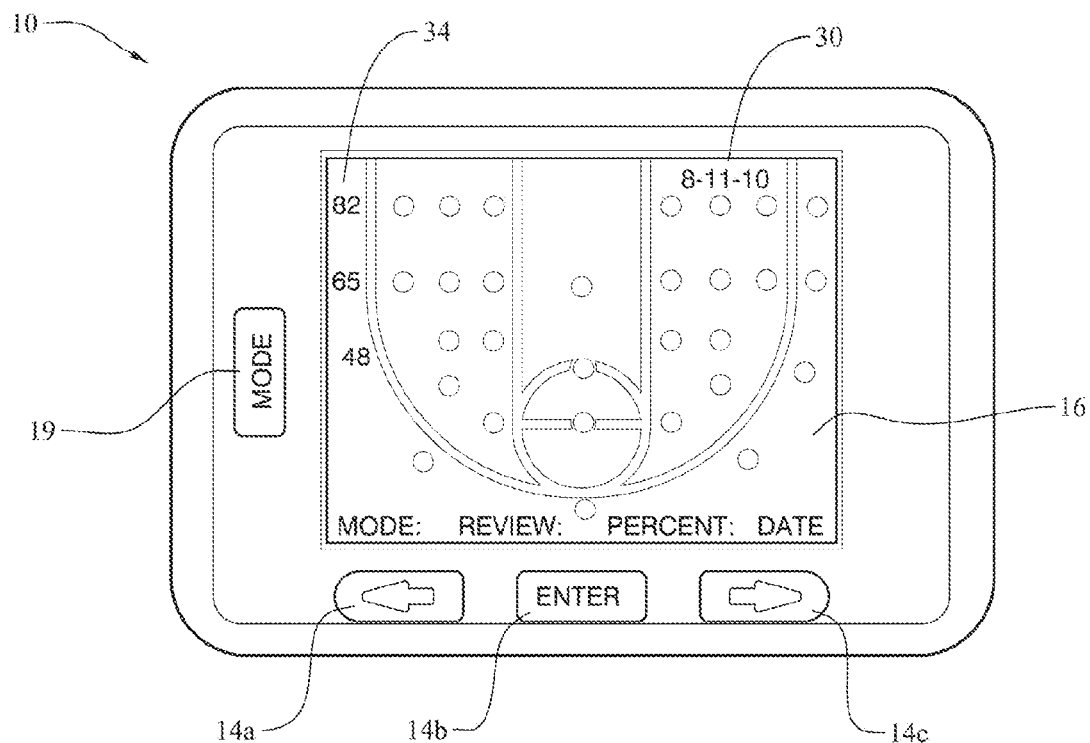

A beneficial feature included in the display unit 10, 100 is a review mode, as shown in FIG. 15. The review mode provides a strong development tool to a user by allowing a user to review historical data of shooting sessions to determine whether the person's shooting skills are improving over time. The ability to review and analyze data helps to achieve goal improvement. Players are feasibly able to record shooting statistics which means they can actually set goals for improvement. Goals have been shown to increase performance and display unit 10, 100 provides the essential tool to help goal improvement. Display unit 10, 100 is capable of storing historical data of percentages or ratios of made basketball shots and missed basketball shots that occurred on a particular date or in a particular shooting session. To access review mode, a user simply depresses the mode button 19, 119 and enters the review mode by depressing the enter key 14b. The type of review information such as percentages or ratios of made and missed shots is accessible along with corresponding dates or shooting session identifiers. For example, the display unit 10 may show that 82% of the shots were made basketball shots at a particular shooting location, as denoted by 34 on the display 16, 116, in FIG. 15. The review mode may also provide an all-time review to allow a user to review all the data over a continuous time period. Display unit 10, 100 may further include a comparison mode that allows a person to compare data to help determine shooting weaknesses from particular locations on the court.

In one embodiment, display unit 10, 100 may include a timer for timing individual shooting sessions, a temperature sensor for measuring outside temperature, a stop watch, a built in light for illuminating the display 16, 116, and a low battery indicator to show the charge or operating status of the batteries in either or both of the display unit 10, 100 and/or shot detector 40. In an alternative embodiment, display unit 10, 100 may also include a calorie counter to track burnt calories of an individual player.

In operation, an individual basketball player attaches the shot detector 40 to the rim 71 of a basketball goal 70 using the telescoping pole 80. The detector 40 is elevated from the ground with the pole 80 and the shot detector 40 is situated on the rim plate 73 of the hoop 71 where the shot detector 40 adheres to the rim plate 73 by magnet 54. The telescoping pole 80 is subsequently removed and stored.

The user secures the display unit 10, 100 to the wrist using the wrist attachment 26. The display unit 10, 100 may be secured to either wrist, however, the display unit 10, 100 may be worn on a user's non-shooting wrist so as not to interfere with the person's shooting motion. With a finger of one hand, the user begins to program the display unit 10, 100 where the player enters a number of programs and a number of shooting locations, each program being associated with one or more shooting location on a basketball half court. To begin a shooting session, the player enters the play mode by depressing the mode 19, 119 button on the display unit 10, 100, respectively. Upon selecting a pre-entered program, a blinking indicator is shown on the symbolic half court which is displayed on the display 16, 116 of the display unit 10, 100. The player physically stands on the playing surface at the spot correspondingly identified by the blinking indicator on the display 16, 116 and attempts to shoot a basketball into a hoop 71 of a goal 70 from the indicated location. Three operative measurements are made to determine whether the shot was a made basketball shot or a missed basketball shot.

The three operative measurements include a vibration measurement, a vibration-paddle measurement, and a paddle measurement. In a vibration measurement, when the basketball hits the rim 71 or backboard 74 of the basketball hoop 70, the vibrations are measured by one or more vibration sensors 49 disposed within the shot detector 40. When the vibration sensor 49 is activated, a signal is generated, and the generated signal is transmitted to the display unit 10, 100 via a RF transmitter. The RF receiver of the display unit 10, 100 receives the transmitted signal and processes the signal to determine a missed basketball shot. The information is recorded and stored in memory. In the event a ball is not heavy enough to activate the vibrations sensor or sensors 49 when the ball hits the rim 71 or backboard 74, a user may activate an airball button 118 located on the display unit 10, 100 to record a missed shot.

In a vibration-paddle measurement, when a basketball comes in contact with the rim 71 or backboard 74, the vibration sensor 49 senses the impact and generates a signal. As the ball continues to pass through hoop 71, the ball engages paddle sensor 44 and paddle sensor 44 pivots to generate a signal. Both signals are transmitted, via the RF transmitter, to the RF receiver for processing the signals to determine a made basketball shot. The display unit 10, 100 may include a set amount of time between the vibration sensor 49 and the paddle 44, such as 3 seconds. If the vibration sensor 49 in the shot detector 40 senses a vibration but the basketball does not activate the paddle 44 during the set three seconds, the display unit 10, 100 processes the signal to determine a missed basketball shot. The information is recorded and stored in memory.

In a paddle measurement, when a basketball passes directly through the hoop 71, but does not come in contact with the rim 71 or backboard 74 to trigger the vibration sensor 49, the paddle 44 is activated to generate a signal. The RF transmitter transmits the signal to the receiver of display unit 10, where the display unit 10, 100 processes the signal to determine a made basketball shot. The information is recorded and stored in memory. It will be noted that the recorded data is stamped with a time and/or date, and may also be stamped with a shooting session identifier. Thus, made basketball shots, missed basketball shots and dates are recorded and stored in the display unit 10. Shot data may also include shooting locations the basketball was thrown from.

Shot detector 40 wirelessly transmits data, via a transmitter, to the display unit 10. The display unit 10, 100 receives the data via, a receiver, and processes the information to determine whether a basketball was successfully made or missed. Shot data is collected during a shooting or playing session and the data is stored in memory to provide real-time and long-term tracking. The data may be uploaded to a computer via, USB port 28, for processing the data, storing the data, transferring the data or for generating data charts or graphs. The wireless tracking system of the present invention may include receivers/transmitters or transceivers for providing RF communication between a shot detector 40 and display unit 10, 100. The wireless tracking system may include any type of wireless transmission technology, including, but not limited to, Wi-Fi, 3G, 2G, 2.5G, 4G, WiMax, and Bluetooth technology.

In an alternative embodiment, display unit 10, 100 may incorporate the use of motion technology. For example, display unit 10, 100 may include an accelerometer to provide spatial data as to when and possibly where a user is shooting the basketball. The motion technology system could use infrared technology, or wireless communication. The motion technology provides the ability to track the shooting data of a user without the user relying on the directive instructions provided by display unit 10, 100.

The embodiments described with reference to the figures include a hands-free-portable device that is wearable on a person's wrist. Alternative embodiments are contemplated in which the hands-free-portable device can be a carry-on device such as a smartphone, a portable media player, and a PDA. Further, the hands-free-portable device can be an electronic device that is wearable on any body part of a user, such as an arm, leg, ankle, waist, neck, face or head.

The invention further contemplates a non-transitory processor-readable medium having processor-executable instructions stored thereon that, when executed by an electronic processor, cause the hands-free-portable electronic device processor to carry out the method claimed herein. Generally, the processor-executable instructions are downloaded from the processor-readable medium, either locally (e.g., through a USB port, a Bluetooth connection, or a Wi-Fi connection) or remotely (e.g., through the Internet), to the hands-free-portable electronic device. For instance, it is contemplated that an application may be downloaded and installed in a smartphone or similar operating-system-provided electronic device, so that running the installed application causes the smartphone or device to function as a hands-free-portable electronic device as claimed herein.

As to the shot detector, alternative embodiments are contemplated in which the shot detector may not include a paddle. In general, the shot detector may comprise one or more physical devices which can be placed on the backboard, the hoop, or both. The shot detector includes at least one of a vibration sensor, an activator, an infrared sensor, an ultrasonic motion sensor and a motion detector. For instance, the shot detector may consist of several vibration sensors arranged on the backboard and a motion detector facing the inside of the hoop, to detect passing of the ball. Alternatively, the shot detector may consist of motion detectors facing the inside of the loop and additional motion detectors facing the outside of the loop. In alternative embodiments, the shot detector can consist of ultrasonic motion sensor(s) facing into the hoop, out of the hoop and on the backboard area. Furthermore, the shot detector can consist of an infrared sensor emitting a laser beam across the hoop, the laser beam being reflected on a device arranged opposite to the infrared sensor, the sensor detecting reflection of the laser beam except when a ball passes through (interruption of detection thereby indicating a made shot).

The display unit embodiments explained heretofore include a visual user interface, i.e., a user interface capable of providing visual indications or images to the user (via display 16, 116). In general, however, it is contemplated that the hands-free-portable device shall include a user interface configured to provide sensory indications of any sort that the user is able to perceive while playing basketball. Particularly, an alternative embodiment is contemplated in which the hands-free-portable device includes a user interface comprising a sound emitter, wherein the sound emitter is configured to emit sounds to indicate where the next shot should be taken from; examples of sound emitters are a speaker, a buzzer, a beeper, a mechanical ringer, etc. For instance, the hands-free-portable device memory may include stored audio recordings of voice indications instructing where to shoot from (e.g., "take a central three-point shot"), and a speaker may emit the recordings to indicate the player where the next shot is to be taken. Further embodiments are contemplated in which the hands-free-portable device includes a user interface comprising one or more haptic actuators (e.g., vibrators), to provide tactile indications to the player on where to take the next shot from. For instance, the hands-free-portable device could generate a single vibration pulse to instruct the player to take a one-point free throw or foul shot, two consecutive pulses to instruct the player to take a two-point shot, and three consecutive pulses to instruct the player to attempt a three-pointer. Combinations of visual, audio and haptic user interfaces are also envisaged.

In certain embodiments, the hands-free-portable device including a display may view alternative or complementary images to that of half a basketball court. For instance, the display can view an entire basketball court, and provide visual indications on any part of the court. Alternatively, the display can view any portion of a basketball court (e.g., the free-throw circle). In further embodiments, the hands-free-portable device can display videos to indicate the player where to shoot from, and even how to shoot (e.g., view a short clip of a player carrying out a hook shot, or a layup). The display can also show text indicating where to shoot from. Combinations thereof are also envisaged.

In addition, it is contemplated that the visual, audible and/or tactile user interface can provide sensory indications as to how to shoot, in addition to, or alternatively to, sensory indications on where to shoot from. For instance, a visual user interface display or audio emitter can instruct the user to carry out at "HOOK", "BANK", "LAYUP", "RUNNER", "TURNAROUND", "LEFTHAND", "RIGHTHAND", just to name a few. This provides further possibilities in helping basketball players train.

The display unit embodiments explained heretofore include buttons to allow the user to operate the unit. In general, it is contemplated that the hands-free-portable electronic device can include a user interface that is operable by the user to provide inputs to the hands-free-portable electronic device processor. For instance, the hands-free-portable device may alternatively include a tactile display that the user can touch to operate the device. The hands-free-portable device may include a voice recognition function that allows the user to provide voice instructions to the hands-free-portable device. Any combination thereof is also envisaged. User action on the user interface allows the user to operate the device for any applicable action. In particular, user action on the user interface can cause the hands-free-portable device processor to switch between the play mode, in which shooting location indications are generated according to a predefined program, and the random mode, in which shooting locations indications are selected and generated randomly.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A wireless basketball shot tracking system for tracking real time shooting data of basketball shooting sessions, said wireless basketball shot tracking system comprising:
    a hands-free-portable electronic device comprising:
        a processor, memory, and an RF receiver;
        a power source;
        a user interface for providing sensory indications to a user;
    a shot detector in wireless communication with said hands-free-portage electronic device, said shot detector including a power source, an RF transmitter, and at least one of a vibration sensor, an activator, an infrared sensor, an ultrasonic motion sensor and a motion detector, wherein said shot detector is mountable to a basketball backboard, hoop, net or combination thereof; wherein
    said hands-free-portable electronic device memory comprises an executable set of instructions to cause the hands-free-portable electronic device to perform the operations of:
    a) obtaining a specific basketball shooting style or location from which to carry out a shot, by either reading information from the memory pertaining to said specific shooting style or location or by randomly generating said specific shooting style or location;
    b) providing a sensory indication via the user interface corresponding to said specific shooting style or location;
    c) receiving a signal from the shot detector, containing information indicating whether the shot has been made or missed;
    d) storing said information indicating whether the shot has been made or missed, in association with said specific shooting style or location;
    e) repeating steps (a) through (d) a plurality of times, to provide a sequence of basketball shooting style or location sensory indications via the user interface that the user can follow as a training guide.

2. The wireless basketball shot tracking system of claim 1, wherein the user interface comprises a display, and wherein the sensory indication corresponding to the specific shooting style or location comprises a visual indication provided on the display.

3. The wireless basketball shot tracking system of claim 2, wherein the display operatively depicts at least part of a basketball court, and the sensory indication corresponding to the specific shooting style or location comprises a mark on said at least part of a basketball court.

4. The wireless basketball shot tracking system of claim 1, wherein the user interface comprises a sound emitter, and wherein the sensory indication corresponding to the specific shooting style or location comprises an audible indication provided by the sound emitter.

5. The wireless basketball shot racking system of claim 1, wherein the user interface comprises a haptic actuator, and wherein the sensory indication corresponding to the specific shooting style or location comprises a tactile indication provided by the haptic actuator.

6. The wireless basketball shot tracking system of claim 1, wherein said hands-free-portable electronic device user interface is operable by the user to provide an input to the hands-free-portable electronic device processor.

7. The wireless basketball shot tracking system of claim 1, wherein said hands-free-portable electronic device further includes a communications port for transmitting and/or receiving digital information to and/or from an external electronic device.

8. The wireless basketball shot tracking system of claim 7, wherein said hands-free-portable electronic device memory further comprises an executable set of instructions to cause the hands-free-portable electronic device to perform the operation of transmitting stored information indicating whether a plurality of shots have been made or missed, and their associated specific shooting style or location, via said communications port.

9. The wireless basketball shot tracking system of claim 1, wherein said activator comprises an elongated paddle having a proximal end and a distal end, said proximal end pivotably connected to a main body of said shot detector.

10. The wireless basketball shot tracking system of claim 9, wherein said shot detector is configured to be situated on said hoop such that said paddle extends along a horizontal plane within a central region of said hoop and said paddle distal end is arranged in said central region.

11. The wireless basketball shot tracking system of claim 1, wherein said shot detector comprises at least one vibration sensor and an activator, and wherein said hands-free-portable electronic device memory comprises an executable set of instructions to cause the hands-free-portable electronic device to perform the operations of:
receiving a signal from the shot detector indicating a vibration has been detected by at least one vibration sensor;
starting a predetermined time counter;
storing information indicating the shot has been missed, in association with said specific style or location, in the event that the predetermined time counter expires without having received a signal from the shot detector indicating the activator has made a positive detection.

12. The wireless basketball shot tracking system of claim 1, further including a telescoping pole having a tip, said tip removably engaging with said shot detector to elevate said shot detector from the ground to attach said shot detector to said hoop.

13. The wireless basketball shot tracking system of claim 1, wherein said hands-free-portable electronic device memory comprises an executable set of instructions corresponding to a program mode for storing a plurality of programs and a plurality of basketball shooting styles or locations, each of said plurality of programs associated with one or more of said plurality of basketball shooting styles or locations.

14. The wireless basketball shot tracking system of claim 1, wherein said hands-free-portable electronic device further comprises an executable set of instructions corresponding to a play mode for providing real time shot data to a user via said user interface, said real time shot data including percentages or ratios of made and/or missed basketball shots.

15. The wireless basketball shot tracking system of claim 1, wherein said hands-free-portable electronic device memory further comprises an executable set of instructions to cause the hands-free-portable electronic device to perform the operations of:
f) receiving a user input from said user interface; and
g) in dependence of said user input, switching between an operational mode in which step a) is carried out by randomly generating said specific shooting style or location, and an operational mode in which step a) is carried out by reading information from the memory pertaining to said specific shooting style or location, said information being comprised in a predefined shooting style or location sequence stored in said memory.

16. The wireless basketball shot tracking system of claim 1, wherein said hands-free-portable electronic device is at least one of a smartphone, a portable media player, a PDA, an electronic device that is wearable on a body part of a user, and any combination thereof.

17. A wireless basketball shot tracking method, carried out by a hands-free-portable electronic device comprising a processor, memory, an RF receiver, a power source, and a user interface for providing sensory indications to a user, said method comprising the steps of:
a) obtaining a specific basketball shooting style or location from which to carry out a shot, by either reading information from said memory pertaining to said specific shooting style or location or by randomly selecting a specific shooting style or location from a set of different shooting styles or locations stored in said memory;
b) providing a sensory indication via said user interface corresponding to said specific shooting style or location;
c) receiving a signal from a shot detector via said RF receiver, said signal containing information indicating whether the shot has been made or missed;
d) storing said information indicating whether the shot has been made or missed, in association with said specific shooting style or location;
e) repeating steps (a) through (d) a plurality of times, to provide a sequence of basketball shooting style or location sensory indications via the user interface that the user can follow as a training guide.

18. The wireless basketball shot tracking method of claim 17, further comprising the steps of:
f) detecting a user input on said user interface; and
g) in dependence of said user input, switching between an operational mode in which step a) is carried out by randomly selecting said specific shooting style or location, and an operational mode in which step a) is carried out by reading information from said memory pertaining to said specific shooting style or location, said information being comprised in a predefined shooting style or location sequence stored in said memory.

19. A non-transitory processor-readable medium having processor-executable instructions stored thereon that, when executed by an electronic processor, cause the processor to carry out the operations of:
a) obtaining a specific basketball shooting style or location from which to carry out a shot, by either reading information from a memory pertaining to said specific shooting style or location or by randomly selecting a specific shooting style or location from a set of different shooting style or locations stored in a memory;
b) providing a sensory indication via a user interface corresponding to said specific shooting style or location;

c) receiving a signal from a shot detector via an RF receiver, said signal containing information indicating whether the shot has been made or missed;
d) storing said information indicating whether the shot has been made or missed, in association with said specific shooting style or location;
e) repeating steps (a) through (d) a plurality of times, to provide a sequence of basketball shooting style or location sensory indications via the user interface that the user can follow as a training guide.

20. The non-transitory processor-readable medium of claim 19, further comprising processor-executable instructions stored thereon that, when executed by an electronic processor, cause the processor to carry out the operations of:
f) detecting a user input on said user interface; and
g) in dependence of said user input, switching between an operational mode in which step a) is carried out by randomly selecting said specific shooting style or location, and an operational mode in which step a) is carried out by reading information from said memory pertaining to said specific shooting style or location, said information being comprised in a predefined shooting style or location sequence stored in said memory.

* * * * *